US011977340B2

(12) United States Patent
Ji et al.

(10) Patent No.: US 11,977,340 B2
(45) Date of Patent: May 7, 2024

(54) CHARGING MEMBER HAVING TWO SURFACE LAYERS

(71) Applicant: Hewlett-Packard Development Company, L.P., Spring, TX (US)

(72) Inventors: Youngphil Ji, Seongnam-si (KR); Jisoo Heo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/030,871

(22) PCT Filed: Oct. 14, 2020

(86) PCT No.: PCT/US2020/055491
§ 371 (c)(1),
(2) Date: Apr. 7, 2023

(87) PCT Pub. No.: WO2022/081148
PCT Pub. Date: Apr. 21, 2022

(65) Prior Publication Data

US 2023/0367237 A1 Nov. 16, 2023

(51) Int. Cl.
*G03G 15/02* (2006.01)

(52) U.S. Cl.
CPC ... *G03G 15/0233* (2013.01); *G03G 2215/021* (2013.01); *G03G 2215/025* (2013.01)

(58) Field of Classification Search
CPC ......... G03G 15/0233; G03G 2215/021; G03G 2215/025
See application file for complete search history.

(56) References Cited

U.S. PATENT DOCUMENTS

| | | | | |
|---|---|---|---|---|
| 2006/0029428 | A1* | 2/2006 | Taniguchi | G03G 15/2057 399/176 |
| 2008/0107451 | A1 | 5/2008 | Nukada et al. | |
| 2008/0232857 | A1 | 9/2008 | Matsumoto et al. | |
| 2010/0142998 | A1* | 6/2010 | Furukawa | G03G 15/0233 399/176 |
| 2013/0196836 | A1 | 8/2013 | Ichizawa | |

(Continued)

FOREIGN PATENT DOCUMENTS

| | | |
|---|---|---|
| JP | 2008-180775 A | 8/2008 |
| JP | 2009-009028 A | 1/2009 |

(Continued)

*Primary Examiner* — Joseph S Wong
(74) *Attorney, Agent, or Firm* — Brooks, Cameron & Huebsch, PLLC

(57) ABSTRACT

An example charging member has a conductive support, a conductive elastic body layer on the conductive support, a first surface layer on the conductive elastic body layer, and a second surface layer on the first surface layer. The first surface layer includes a binder resin and a first plurality of first particles dispersed in the binder resin of the first surface layer, the second surface layer includes the binder resin, a second plurality of first particles, and second particles, the second plurality of first particles and the second particles being dispersed in the binder resin of the second surface layer, and an average diameter $d_1$ of the first particles is 3 $\mu m \le d_1 \le 6$ $\mu m$ and an average diameter $d_2$ of the second particles is 20 $\mu m \le d_2 \le 26$ $\mu m$.

15 Claims, 2 Drawing Sheets

(56) References Cited

U.S. PATENT DOCUMENTS

| | | | | |
|---|---|---|---|---|
| 2014/0334843 | A1 | 11/2014 | Taniguchi et al. | |
| 2018/0364605 | A1 | 12/2018 | Yoshida et al. | |
| 2019/0271931 | A1 | 9/2019 | Kuroda | |
| 2019/0346786 | A1* | 11/2019 | Mori | G03G 15/0233 |

FOREIGN PATENT DOCUMENTS

| | | | |
|---|---|---|---|
| JP | 2009-086263 | A | 4/2009 |
| JP | 2012-141386 | A | 7/2012 |
| JP | 2018-084653 | A | 5/2018 |

* cited by examiner

CHARGING MEMBER HAVING TWO SURFACE LAYERS

BACKGROUND

An electrophotographic imaging apparatus may include a photoconductor, a charging roller, a developing roller, and a transfer roller, which are provided around the photoconductor. The charging roller is to charge a surface of the photoconductor to a predetermined voltage. An electrostatic latent image corresponding to print data may be formed on the charged surface of the photoconductor with light emitted from an exposure unit. The developing roller supplies a developer to the photoconductor to develop the electrostatic latent image into a developer image. The developer image is transferred by the transfer roller onto an image receiving member (e.g., print medium) passing between the photoconductor and the transfer roller.

BRIEF DESCRIPTION OF DRAWINGS

Various examples will be described below with reference to the following figures.

DETAILED DESCRIPTION OF EXAMPLES

Figure 1:
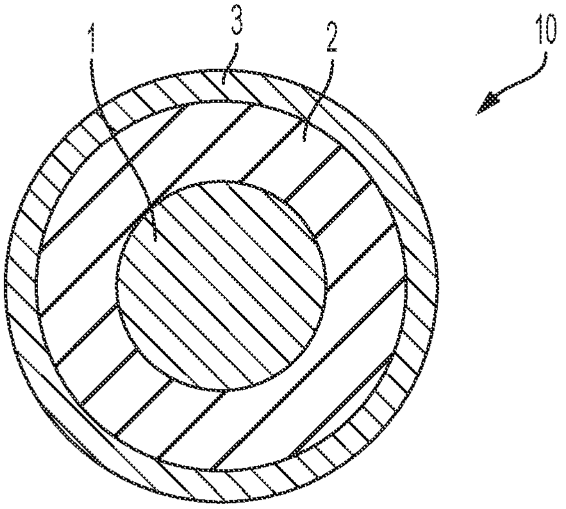
FIG. 1 is a cross-sectional view schematically illustrating a charging roller according to an example.

Hereinafter, various examples will be described with reference to the accompanying drawings. In the following description, components having substantially the same functional configuration will be omitted by repeating the same reference numerals.

When an electrostatic latent image is to be formed on a surface of a photoconductor, a contact charging method may be used in which a charging roller contacts the photoconductor to charge a surface of the photoconductor. In an example, an electroconductive roller may be used as the charging roller. In this example method, a surface of the photoconductor is charged by applying a voltage to a conductive support (e.g., a shaft) of the charging roller and performing a micro-discharge in the vicinity of a contact nip between the charging roller and the photoconductor. The charging roller may have a structure in which a conductive elastic body layer is formed on the conductive support (e.g., a shaft) and a resistance layer is formed on the conductive elastic body layer.

Through use in a contact charging method, a charging member (e.g., charging roller) may electrically deteriorate due to surface wear. In that case, a charging performance may also deteriorate with the passage of time. When charging performance deteriorates, a charging ability of the charging member may be reduced, and image defects such as background (B/G) defects and micro-jitter (e.g., fine horizontal stripes) defects may occur.

Hereinafter, an example charging member, an electrophotographic cartridge including the charging member, and an electrophotographic imaging apparatus will be described. A description will be made based on a charging roller as an example. However, the following description may be equally applied to a charging member having a shape other than a roller.

A charging member according to an example may include a conductive support, a conductive elastic body layer, and a surface layer as an outermost layer.

FIG. 1 is a schematic cross-sectional view of a charging roller according to an example.

Referring to FIG. 1, in a charging roller 10, a conductive elastic body layer 2 and a surface layer 3 are provided on an outer circumference surface of a conductive support 1. The conductive elastic body layer 2 and the surface layer 3 may be provided in this order from an inner side in the diameter direction of the charging roller 10 toward the outer side in the diameter direction of the charging roller 10. In an example, the conductive elastic body layer 2 and the surface layer 3 may be integrally laminated on the outer circumference surface of the conductive support 1. An intermediate layer (not shown) such as a resistance adjustment layer for increasing voltage resistance (i.e., leak resistance) may be formed between the conductive elastic body layer 2 and the surface layer 3.

In an example electrophotographic imaging apparatus, the charging roller 10 shown in FIG. 1 may be provided as a charging means for charging a body to be charged. For example, the charging roller 10 may function as a charging means for charging a surface of a photoconductor as an image carrier.

Conductive Support 1

In an example, the conductive support 1 includes a metal having electrical conductivity. For example, the conductive support 1 may include a metallic hollow body (e.g., a pipe shape) or a metallic solid body (e.g., a rod shape). The conductive support 1 may include iron, copper, aluminum, nickel, stainless steel, or the like. An outer circumference surface of the conductive support 1 may be plated for reducing or preventing rust or to provide scratch resistance. The outer circumference surface of the conductive support 1 may be plated to a degree that does not impair electrical conductivity. Further, the outer circumference surface of the conductive support 1 may be coated with an adhesive, a primer, or the like in order to increase adhesion of the conductive elastic body layer 2, if necessary. In this case, in order to provide electrical conductivity, the adhesive, primer, etc. in itself may be electrically conductive as needed.

In an example, the conductive support 1 may have a cylindrical shape having a diameter of about 4 mm to about 20 mm, for example, about 5 mm to about 10 mm, and having a length of about 200 mm to about 400 mm, for example, about 250 mm to about 360 mm. The above dimensions are provided as examples and are not to be construed as limiting.

Conductive Elastic Body Layer 2

The conductive elastic body layer 2 is to cover an outer periphery of the conductive support 1. In an example, the conductive elastic body layer 2 may have elasticity suitable for securing uniform adhesion to a photoconductor. The conductive elastic body layer 2 may be formed by mixing a conducting agent and a polymeric elastomer. For example, the conductive elastic body layer 2 may be formed using a polymeric elastomer binder resin selected from natural rubbers, synthetic rubbers such as ethylene-propylene rubber, ethylene-propylene-diene monomer (EPDM) rubber, butadiene rubber (BR), styrene-butadiene rubber (SBR), a silicone rubber, a polyurethane-based elastomer, epichlorohydrin (ECO) rubber, isoprene rubber (IR), butyl rubber, nitrile rubber, acrylonitrile-butadiene rubber (NBR), hydrogenated NBR (H-NBR), acrylic rubber, chloroprene rubber (CR), or a mixture thereof, or using a synthetic resin such as an amide resin, a urethane resin, a silicone resin, or the like. These may be used alone or in combination of two or more.

In an example, as epichlorohydrin (ECO) rubber containing ethylene oxide (EO) has ionic conductivity and is relatively low and stable in electrical resistance, the ECO rubber may be used as a binder resin. The conductive elastic body layer 2 may contain ECO rubber and may contain ECO rubber as a main component. In an example, the conductive elastic body layer 2 may contain ECO rubber in an amount of 50.0 wt % or more or 80.0 wt % or more.

The charging roller 10 may be in contact with a photoconductor (e.g., electrophotographic photoconductor drum 11 of FIG. 3) when used in a contact developing method, and may be spaced apart from the photoconductor when used in a non-contact developing method.

In the case of a one-component contact developing method, the conductive elastic body layer 2 may be adjusted to have a hardness of 25 to 45 as measured by an Asker-A TYPE durometer, and in the case of a one-component non-contact developing method, the conductive elastic body layer 2 may be adjusted to have a hardness of 40 to 65 as measured by an Asker-A TYPE durometer. In other examples, the hardness may be determined according to a printer speed, lifetime, cost, etc., and the hardness may vary depending on the developing method.

The conductive elastic body layer 2 may have a thickness of about 0.5 mm to about 8.0 mm, for example, about 1.25 mm to about 3.00 mm. Within this thickness range, the charging roller 10 exhibits elasticity and recovery against deformation, and a stress imparted to a toner applied to a photoconductor may be reduced. In the case of the one-component non-contact developing method, the thickness of the conductive elastic body layer 2 may be about 0.5 mm to 2.0 mm, and in the case of the one-component contact developing method, the thickness of the conductive elastic body layer 2 may be about 1.5 mm to 8.0 mm.

The conductive elastic body layer 2 may include a conductive agent. The conductive agent may include an ion-conducting agent or an electron-conducting agent. The conductive elastic body layer 2 may include an ion-conducting agent in consideration of resistance stability. Since the ion-conducting agent may be uniformly dispersed in a polymer elastic body to provide uniformity of the electrical resistance of the conductive elastic body layer 2, uniform charging may be obtained even when the charging roller 10 is charged using a DC voltage.

The ion-conducting agent may be selected depending on the purpose. Examples of the ion-conducting agent may include alkali metal salts, alkaline earth metal salts, perchlorates of quaternary ammonium, chlorates, hydrochlorides, bromates, iodates, hydroborates, sulfates, trifluoromethyl sulfates, sulfonates, and trifluoromethane sulfonates. These may be used alone or in combination of two or more. The alkali metal salts may be selected depending on the purpose. Examples thereof may include lithium salts, sodium salts, or potassium salts. These may be used alone or in combination of two or more. Examples of the lithium salts may include $Li[B(C_{14}H_{10}O_3)_2]$, $Li(CF_3SO_2)_2N$, $Li(C_2F_5SO_2)_2N$, $LiClO_4$, $LiBF_4$, $LiPF_6$, $LiCF_3SO_3$, $LiAsF_6$, $LiC_4F_9SO_3$, and the like.

Examples of the quaternary ammonium salts may include cationic surfactants such as lauryl trimethyl ammonium chloride, stearyl trimethyl ammonium chloride, octadecyl trimethyl ammonium chloride, dodecyl dimethyl ammonium chloride, hexadecyltrimethylammonium chloride, trioctylpropylammonium bromide, tetrabutylammonium chloride, and behenyl trimethyl ammonium chloride, amphoteric surfactants such as lauryl betaine, stearyl betatine, dimethyl lauryl betaine, tetraethyl ammonium perchlorate, tetrabutyl ammonium perchlorate, and trimethyl octadecyl ammonium perchlorate, or the like.

The amount of the ion-conducting agent used may be in a range of about 0.01 parts by weight to about 10 parts by weight, or in a range of about 0.5 parts by weight to about 5 parts by weight, based on 100 parts by weight of the binder resin. These ion-conducting agents may be used alone or in combination of two or more.

The electron-conducting agent may be used in combination with the ion-conducting agent. As the electron-conducting agent, for example, carbon black may be used. Examples of the carbon black may include conductive carbon black such as oxidized carbon black for use in ink to improve dispersibility, ketjen black, and acetylene black, carbon black for rubber such as SAF, ISAF, HAF, FEF, GPF, SRF, FT, and MT grades, and pyrolytic carbon black, natural graphite, and artificial graphite. As the electron-conducting agent, for example, metal oxides such as tin oxide, antimony-doped tin oxide, indium tin oxide (ITO), titanium oxide, zinc oxide, metals such as nickel, copper, silver, germanium, etc., electrically conductive polymers such as polyaniline, polypyrrole, polyacetylene, etc., and conductive whiskers such as carbon whisker, graphite whisker, titanium carbide whisker, conductive potassium titanate whisker, conductive barium titanate whisker, conductive titanium oxide whisker, conductive zinc oxide whisker, etc. may be used. To reduce a difference in electrical resistance and to reduce a hardness, a small amount of the electron-conducting agent may be used. The amount of the electron-conducting agent used may be in a range of about 30 parts by weight or less, for example, in a range of about 10 parts by weight or less, based on 100 parts by weight of the binder resin.

The resistance value of the conductive elastic body layer 2 by the combination of the conducting agent may be adjusted to about $10^3\Omega$ to about $10^{10}\Omega$, and may be adjusted to about $10^4\Omega$ to about $10^8\Omega$. When the resistance value of the conductive elastic body layer 2 is less than $10^3\Omega$, the charges on the photoconductor may leak and thus an imbalance in electrical resistance may occur to cause spots on an image, or hardness may increase to make uniform contact with the photoconductor difficult, and image stains may occur. When the resistance value of the conductive elastic body layer 2 is more than $10^{10}\Omega$, a background (B/G) image defect may occur.

The conductive elastic body layer 2 may contain additives such as a filler, a foaming agent, a crosslinking agent, a crosslinking accelerator, a lubricant, an auxiliary agent, and the like as needed. The crosslinking agent may include sulfur. In various examples, the crosslinking accelerator may include tetramethylthiuram disulfide (CZ), the lubricant may include stearic acid, and the auxiliary agent may include zinc oxide (ZnO).

Surface Layer 3

Figure 2:
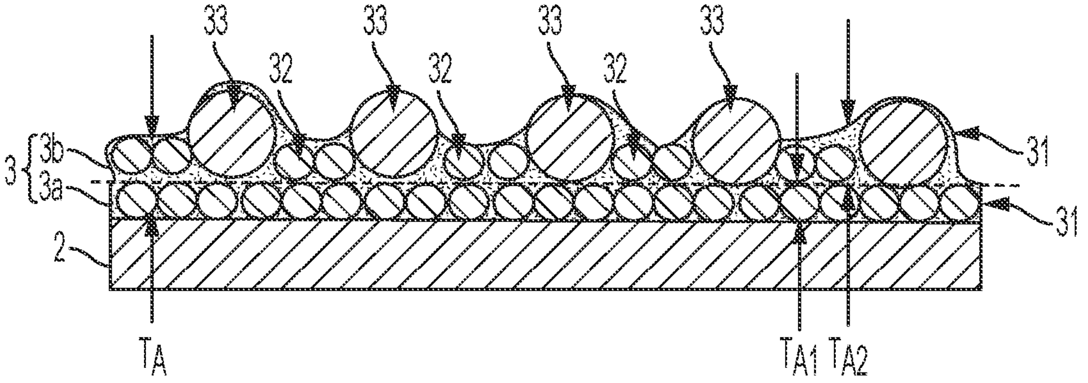
FIG. 2 is a cross-sectional view schematically illustrating an enlarged surface layer of a charging roller according to an example.

FIG. 2 is a schematic cross-sectional view illustrating an enlarged surface layer of a charging roller according to an example.

Referring to FIG. 2, the surface layer 3 may include a first surface layer 3*a* and a second surface layer 3*b*. The first surface layer 3*a* may be located on the conductive elastic body layer 2 and the second surface layer 3*b* may be located on the first surface layer 3*a*.

The first surface layer 3*a* may include binder resin 31 and first particles 32. The second surface layer 3*b* may include binder resin 31, first particles 32, and second particles 33. In an example, the first surface layer 3*a* includes only first particles 32 with the binder resin 31 and the second surface layer 3*b* includes both first particles 32 and second particles 33 with the binder resin 31.

The binder resin 31 may be selected to avoid contamination of a photoconductor, which is a body to be charged. Examples of the binder resin may include a fluorine resin, a polyamide resin, an acrylic resin, a nylon resin, epichlorohydrin (ECO) rubber, a urethane resin, a silicone resin, a butyral resin, styrene-ethylene/butylene-olefin copolymer (SEBC), and olefin-ethylene/butylene-olefin copolymer (CEBC). These may be used alone or in combination of two or more.

In an example in which the binder resin contains urethane resin, the urethane resin may be formed by a chain extension reaction of a polyol mixture of polyester polyol and polyether polyol with a polyisocyanate. Since polyester polyol and polyether polyol are used together, their respective advantages may be used together.

The urethane resin formed by the chain extension reaction of a polyester polyol with a polyisocyanate has excellent wear resistance at relatively low hardness. However, since the urethane resin obtained by using a polyester polyol may deteriorate at low temperature, when the urethane resin is used for a long period of time under low-temperature environments, electrical resistance may vary, and a background (B/G) image defect may occur. Further, since an ester-based urethane may be vulnerable to hydrolysis, when the ester-based urethane is used under high-temperature and high-humidity environments, its properties may change.

The urethane resin formed by the chain extension reaction of a polyether polyol with a polyisocyanate has low-temperature flexibility and relatively low electrical resistance, and thus has stability. However, a polyester polyol and a polyether polyol have poor compatibility and may thus cause separation or curing difficulties. When a polyether polyol having an ethylene oxide (EO) content of about 60 wt % to about 90 wt % is used, compatibility with a polyester polyol may be addressed. The polyether polyol having an ethylene oxide (EO) content of about 60 wt % to about 90 wt % may have good compatibility with a polyester polyol. In addition, the surface layer 3 produced using this urethane resin may have low-temperature flexibility, relatively low electrical resistance, physical stability, and resistance stability at low hardness.

The urethane resin may be formed by a chain extension reaction of a polyol mixture of a polyester polyol and a polyether polyol having an ethylene oxide (EO) content of about 60 wt % to about 90 wt % with a polyisocyanate. The content ratio of a polyester polyol and a polyether polyol may be adjusted in a range of 8:2 to 2:8. When the content ratio of any one of the polyester polyol and polyether polyol is too low, improvement effects may be reduced.

As the polyester polyol, a polycaprolactam-based polyol, an adipic acid-based polyol, or the like may be used. The polyester polyol may be obtained by an esterification reaction between a compound having two or more hydroxyl groups and a polybasic acid, or may be obtained by a ring-opening addition reaction of cyclic esters such as ε-caprolactone, β-butyrolactone, γ-butyrolactone, γ-valerolactone, and δ-valerolactone using a compound having two or more hydroxyl groups as an initiator. Although polylactone-based polyols may be distinguished from polyester polyols, here, they are considered as a kind of the polyester polyols.

Examples of the aforementioned compound having two or more hydroxyl groups may include glycol compounds such as ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-cyclohexanedimethanol, glycol compounds having a branched structure such as 2-methyl-1,5-pentane diol, 3-methyl-1,5-pentane diol, 1,2-butanediol, 1,3-butanediol, 2-butyl-2-ethyl-1,3-propanediol, 1,2-propane diol, 2-methyl-1,3-propanediol, neopentyl glycol, 2-isopropyl-1,4-butanediol, 2,4-dimethyl-1,5-pentane diol, 2,4-di ethyl-1,5-pentane diol, 2-ethyl-1,3-hexanediol, 2-ethyl-1,6-hexanediol, 3,5-pentanediol, and 2-methyl-1,8-octane diol, and trimethylol propane, trimethylol ethane, pentaerythritol, and sorbitol. These compounds may be used alone or in combination of two or more.

Among ester-based polyols, an ester-based polyol having a liquid phase at room temperature may be easy to handle, may be difficult to aggregate in a coating solution, and may not generate spots on an image. Further, ester-based polyols having three or more hydroxyl groups may have a small amount of permanent deformation and good stability.

Examples of the aforementioned polybasic acid may include adipic acid, succinic acid, azeraic acid, sebacic acid, dodecanedicarboxylic acid, maleic anhydride, fumaric acid, 1,3-cyclopentanedicarboxylic acid, 1,4-cyclohexanedicarboxylic acid, and anhydrides thereof. These polybasic acids may be used alone or in combination of two or more.

As the polyether polyol having an ethylene oxide (EO) content of about 60 wt % to about 90 wt %, a bifunctional glycol or a trifunctional or more polyether polyol such as an ethylene oxide-polypropylene oxide copolymer may be used. In an example, the ethylene oxide-polypropylene oxide copolymer may be a random copolymer because hardness of the urethane resin may become low due to low crystallinity. The polyether polyol having an ethylene oxide (EO) content of about 60 wt % to about 90 wt % may be a polyether polyol produced by a random addition and/or block addition of alkylene oxides of 2 to 6 carbon atoms to the aforementioned compound having two or more hydroxyl groups. Examples of the polyether polyol may include polyoxyethylene polyoxypropylene polyol and polyoxyethylene polyoxytetramethylene polyol. For example, a trifunctional or more polyoxyethylene polyoxypropylene polyol having an ethylene oxide residue at its molecular end obtained by random addition polymerization of ethylene oxide and propylene oxide may be used. A trifunctional or more polyoxyethylene polyoxypropylene polyol may be advantageous in terms of suppressing of image defect occurrence in low-temperature and low-humidity environments, as compared with a difunctional or less polyoxyethylene polyoxypropylene polyol.

As the polyisocyanate which undergoes chain-extension with the polyol mixture including a polyester polyol and a polyether polyol having an ethylene oxide (EO) content of about 60 wt % to about 90 wt %, toluene diisocyanate (TDI), diphenylmethane diisocyanate (MDI), isophorone diisocyanate (IPDI), hydrogenated diphenylmethane diisocyanate, hydrogenated toluene diisocyanate, or hexamethylene diisocyanate (HDI) may be used. Further, blocked polyisocyanates obtained by reacting HDI and a blocking agent have storage stability because a reactive isocyanate group is blocked to inhibit a reaction at room temperature. As the blocking agent, for example, methyl ethyl ketone oxime having good storage stability and productivity and capable of adjusting dissociation temperature in a range of about 120° C. to about 160° C. may be used. When the blocking agent is dissociated by heating, an isocyanate group is regenerated, and thus the blocked polyisocyanate may react with a polyol.

The amount of polyisocyanate added may be adjusted such that the molar ratio ([NCO]/[OH]) of isocyanate (NCO) groups of polyisocyanate to total hydroxyl (OH) groups of the polyol mixture is in a range of about 12 to about 25. Polyether polyols are likely to have a lower reactivity than that of polyester polyols, and unreacted products may be left when the molar ratio is less than 12, and low-temperature flexibility may deteriorate when the molar ratio is more than 25.

The surface layer 3 may contain a small amount of other resin components for the purpose of modifying the surface layer 3. As the other resin components, a silicone graft polymer, silicone oil, an acrylic resin, or a fluorine resin may be used for improving the stain resistance of the surface.

The surface layer 3 may include other additives such as a conducting agent, a leveling agent, a filler, an antifoaming agent, a surface modifier, a dispersant, or a charge control agent. In this case, as the conducting agent, an ion-conducting agent and/or an electron-conducting agent may be used.

As the ion-conducting agent that may be used for the surface layer 3, there are alkali metal salts, alkaline earth metal salts, and quaternary ammonium salts, which may be used for the aforementioned conductive elastic body layer 2. For example, ionic liquid (3M™ Ionic Liquid Antistat FC-5000) represented by the chemical structure of $(n\text{-Bu})_3MeN^{+-}N(SO_2CF_3)$ may be used as the ion-conducting agent because it has thermal stability and may thus be easily dispersed in the urethane resin. The amount of the ion-conducting agent combined may be in a range of about 0.01 parts by weight to about 10 parts by weight or in a range of about 0.5 parts by weight to about 5 parts by weight, based on 100 parts by weight of the urethane resin. As the electron-conducting agent that may be used for the surface layer 3, the aforementioned electron-conducting agent that may be used for the conductive elastic body layer 2 may be used. For example, oxidized carbon black having good dispersibility in the surface layer 3 may be used. Because the electron-conducting agent may have a small variation in electrical resistance, the amount of the electron-conducting agent combined may be in a range of about 0.5 parts by weight to about 10 parts by weight, based on 100 parts by weight of the urethane resin.

To charge a photoconductor stably, the surface layer 3 may include the first surface layer 3*a* and the second surface layer 3*b*. Further, the first surface layer 3*a* may contain first particles 32 and the second surface layer 3*b* may contain first particles 32 and second particles 33 to obtain a profile (e.g., unevenness) on the surface thereof. The particles for forming the profile may include resin particles or inorganic particles. Examples of the resin particles may include acrylic resin particles, styrene resin particles, polyamide resin particles, silicone resin particles, vinyl chloride resin particles, vinylidene chloride resin particles, acrylonitrile resin particles, fluorine resin particles, phenol resin particles, polyester resin particles, melamine resin particles, urethane resin particles, olefin resin particles, and epoxy resin particles. The inorganic particles may include silica particles, alumina particles, and the like. In an example, an acrylic resin particle used for first particles 32 and second particles 33 may include a polymethyl methacrylate (PMMA) particle or a polymethyl acrylate (PMAA) particle.

In an example, the first particles 32 may have an average diameter $d_1$ of 3 $\mu m \le d_1 \le 6$ $\mu m$ and the second particles 33 may have an average diameter $d_2$ of 20 $\mu m \le d_2 \le 26$ $\mu m$. In various examples, the coefficient of variation (CV value) of particle size distribution of the first particles 32 and the second particles 33 may be monodispersed or standard dispersed.

The content of the first particles 32 in the first surface layer 3*a* may be in a range of about 5 parts by weight to about 20 parts by weight based on 100 parts by weight of the binder resin 31. The content of the first particles 32 in the second surface layer 3*b* may be in a range of about 5 parts by weight to about 20 parts by weight based on 100 parts by weight of the binder resin 31. The content of the second particles 33 in the second surface layer 3*b* may be in a range of about 5 parts by weight to about 15 parts by weight based on 100 parts by weight of the binder resin 31.

In an example in which first particles 32 are provided in the first surface layer 3*a*, and first particles 32 and second particles 33 are provided in the second surface layer 3*b*, a desired roughness profile of surface layer 3 may be obtained. For example, a surface roughness profile of surface layer 3 may have a maximum profile height $R_Z$ of 18 $\mu m \le R_Z \le 28$ $\mu m$, a mean width of profile elements $RS_M$ of 100 $\mu m \le RS_M \le 400$ $\mu m$, and a profile skewness $R_{SK}$ of $1.0 \le R_{SK} \le 2.0$.

An average total thickness $T_A$ of the surface layer 3 (i.e., a total thickness of first surface layer 3*a*+second surface layer 3*b*) may be 1 $\mu m \le T_A \le 20$ $\mu m$. When the thickness $T_A$ is 1 μm or greater, the first particles 32 and the second particles 33 may be added and maintained without being detached over a longer period of time. When the thickness thereof is 20 μm or less, the charging performance of the charging member 10 may be maintained. In various examples, the average total thickness $T_A$ of the surface layer 3 may be in a range of about 1 μm to about 15 μm, about 1 μm to about 10 μm, about 1 μm to about 8 μm, about 1 μm to about 7 μm, or about 1 μm to about 5 μm. In an example, the average total thickness $T_A$ of the surface layer 3 is 9 $\mu m \le T_A \le 15$ $\mu m$. In more detail, a thickness $T_{A1}$ of the first surface layer 3*a* may be 3 $\mu m \le T_{A1} \le 9$ $\mu m$ while a thickness $T_{A2}$ of the second surface layer 3*b* may be 6 $\mu m \le T_{A2} \le 12$ $\mu m$.

If the average total thickness $T_A$ of the surface layer 3 is too small, wear resistance of the surface layer 3 may decrease due to long-term use, and performance of preventing a phenomenon in which unreacted crosslinking materials are bled out from the conductive elastic body layer 2 to the surface layer 3 deteriorates. When the average total thickness $T_A$ of the surface layer 3 is greater than 20 μm, since the surface layer 3 may become hard and inflexible, its durability may be deteriorated and cracks may be generated by its use. In that case, toner may be damaged so that the toner may stick to the photoconductor or a cleaning blade, resulting in image defects. The average total thickness $T_A$ of the surface layer 3 may be measured by cutting out a cross section of the charging roller 10 with a sharp blade and observing the obtained cross section with an optical microscope or an electron microscope.

When using the charging roller 10 having the surface layer 3 satisfying the above-described conditions, stable charging characteristics may be maintained for a longer period of time even when a DC voltage is applied, and high-quality output images may be obtained. That is, the charging roller 10 may maintain the ability to uniformly charge the photoconductor over a longer period even when it is used in a contact charging manner. In that case, the wear resistance and resistance to electrical deterioration of the charging roller 10 may increase, and charging non-uniformity may be reduced or effectively suppressed, so that the charging performance of the charging roller 10 may be sufficiently maintained even when the charging roller 10 is used for a long period of time. Therefore, since the charging roller 10 can maintain charging performance and charging uniformity even when the charging roller 10 is used for a longer time in an electrophotographic imaging apparatus, it is possible to stably obtain high quality images in which image defects such as background (B/G) defects and micro-jitter are suppressed. Moreover, the charging roller 10 may maintain stable charging characteristics over a longer period of time even when a DC voltage is applied, high-quality output images may be obtained, and a problem of B/G defects under low-temperature and low-moisture environments may be reduced or prevented.

In an example, a DC voltage is applied to the charging roller 10. For example, the bias voltage applied during image output may be about −1500 V to about −1000 V. This may assist in controlling the image density and various conditions while maintaining the charging performance under various environments. When the bias voltage is higher than −1000 V, it becomes difficult to optimize the developing conditions for image formation. In contrast, when the bias voltage is lower than −1500 V, over-discharge tends to occur in the particle portions of the conductive resin layer, and white spot-like image defects tend to occur after image formation.

Method of Manufacturing Charging Member

In an example, the charging member 10 as shown in FIG. 1 may be manufactured as follows. In an example method, components of the materials for the conductive elastic body layer 2 are kneaded using a kneader to prepare materials for the conductive elastic body layer 2. The materials for the first surface layer 3*a* are kneaded using a kneader such as a roll to obtain a mixture, and an organic solvent is added to this mixture, mixed and stirred, thereby preparing a coating liquid for the first surface layer 3*a*. Similarly, the materials for the second surface layer 3*b* are kneaded using a kneader such as a roll to obtain a mixture, and an organic solvent is added to this mixture, mixed and stirred, thereby preparing a coating liquid for the second surface layer 3*b*. In an example, the materials for second surface layer 3*b* include first particles 32 and second particles 33, whereas the materials for first surface layer 3*a* do not include second particles 33. That is, the second particles 33 may not be included in the first surface layer 3*a*.

A mold for injection molding, which is provided with a core (e.g., a shaft) serving as the conductive support 1 therein, is filled with the materials for the conductive elastic body layer 2 by injecting the materials, followed by heating and crosslinking under predetermined conditions. Demolding is performed to a base roll in which the conductive elastic body layer 2 is formed along the outer circumference surface of the conductive support 1.

The coating liquid for the first surface layer 3*a* is applied onto the outer circumference surface of the base roll to form the first surface layer 3*a*. Similarly, the coating liquid for the second surface layer 3*b* is applied onto the outer circumference surface of the first surface layer 3*a* to form the second surface layer 3*b*. In this way, a charging roller 10 in which the conductive elastic body layer 2 is formed on the outer circumference surface of the conductive support 1, the first surface layer 3*a* is formed on the outer circumference of the conductive elastic body layer 2, and the second surface layer 3*b* is formed on the outer circumference of the first surface layer 3*a* may be manufactured.

However, the method of forming the conductive elastic body layer 2 is not limited to injection molding, and casting, press molding, polishing, or a combination thereof may be employed. Also, the method of applying the coating liquid for the first surface layer 3*a* and the second surface layer 3*b* is not particularly limited, and dipping, spray coating, and roll coating may be employed.

Electrophotographic Imaging Apparatus

A charging roller according to an example may be integrated into an electrophotographic cartridge or an electrophotographic imaging apparatus such as a printer, a copier, a scanner, a fax machine, or a multifunction peripheral incorporating two or more of these.

Figure 3:
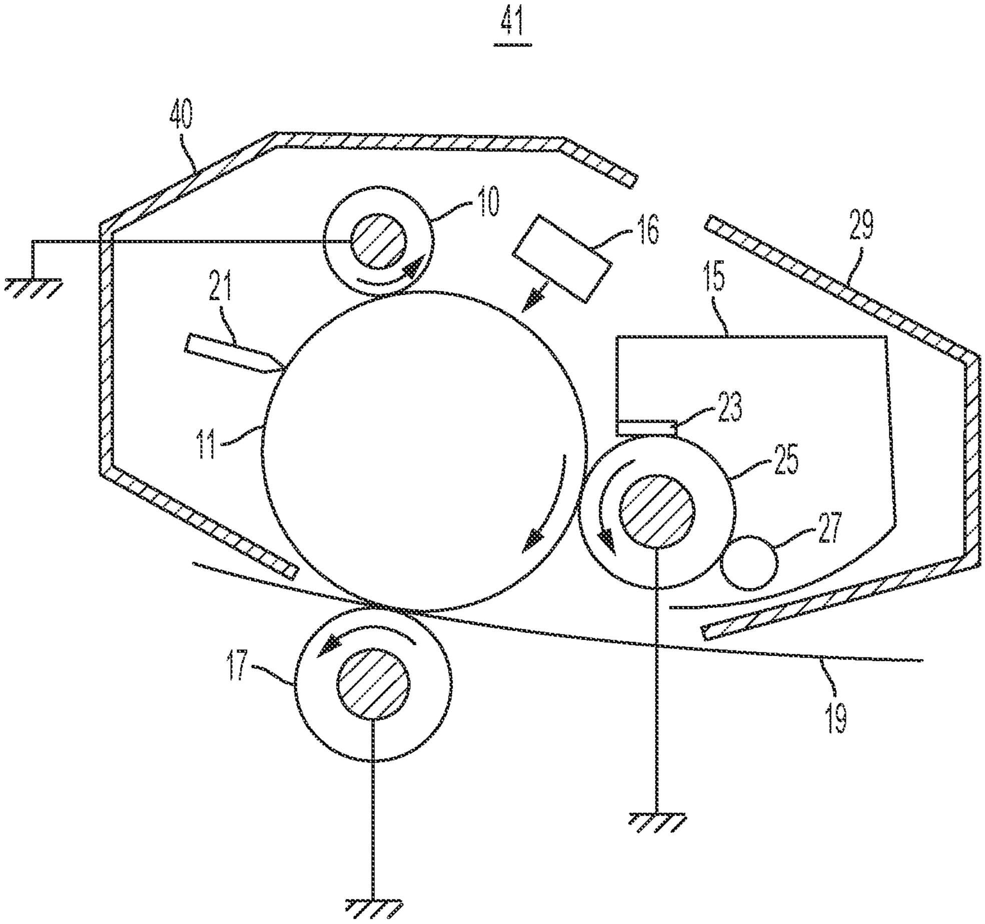
FIG. 3 is a cross-sectional view schematically illustrating an electrophotographic imaging apparatus and an electrophotographic cartridge including a charging roller according to an example.

FIG. 3 is a cross-sectional view schematically illustrating an electrophotographic imaging apparatus and an electrophotographic cartridge including a charging roller according to an example.

Referring to FIG. 3, an electrophotographic imaging apparatus 41 may include an electrophotographic cartridge 40. The electrophotographic cartridge 40 may include an electrophotographic photoconductor drum 11 that is charged by a charging roller 10 according to an example, which is a charging means disposed in contact with the electrophotographic photoconductor drum 11. The electrophotographic photoconductor drum 11 may be rotationally driven at a predetermined circumferential speed about an axis. The electrophotographic photoconductor drum 11 may be subjected to uniform charging of a positive or a negative predetermined potential on its surface by the charging roller 10 in the rotation process. The voltage applied to the charging roller 10 may be, for example, a DC voltage. However, if necessary, the voltage applied to the charging roller 10 may be, for example, a combination of an AC voltage and a DC voltage. In the electrophotographic imaging apparatus 41 according to an example, even when a DC voltage is applied to the charging roller 10, stable charging characteristics may be maintained for a longer period of time, and a high-quality output image may be obtained.

The charging roller 10 may charge the surface of the electrophotographic photoconductor drum 11 to a uniform potential value while rotating in contact with the electrophotographic photoconductor drum 11. The image portion is exposed by laser light from an exposure unit 16 (e.g., a laser scanning device) to form an electrostatic latent image on the electrophotographic photoconductor drum 11. After the electrostatic latent image is made a visible image, for example, a toner image, by a developing unit 15, the toner image is transferred to an image receiving member 19 (e.g., a printing medium such as paper) by a transfer unit 17 (e.g., a transfer roller) to which a voltage is applied. Toner remaining on a surface of the electrophotographic photoconductor drum 11 after the image transfer is cleaned by a cleaning unit, for example, a cleaning blade 21. The electrophotographic photoconductor drum 11 may be used again for image formation. The developing unit 15 includes a regulating blade 23, a developing roller 25, and a supply roller 27.

The electrophotographic cartridge 40 according to an example may integrally support the electrophotographic photoconductor drum 11, the charging roller 10, and the cleaning blade 21, may be attached to the electrophotographic imaging apparatus 41, and may be detached from the electrophotographic imaging apparatus 41. Another cartridge 29 may integrally support the developing unit 15 including the regulating blade 23, the developing roller 25, and the supply roller 27, and may be attached to the electrophotographic imaging apparatus 41, and may be detached from the electrophotographic imaging apparatus 41. Toner (not shown) may be located inside the developing unit 15.

EXAMPLES

Hereinafter, various examples will be described. However, the scope of the disclosure is not limited thereto.

Formation of Conductive Elastic Body Layer 2

An adhesive was applied to a cylindrical stainless-steel shaft having a diameter of 8 mm and a total length of 324 mm (the surface thereof was electroless plated with nickel) and was dried. This shaft was used as a support. 100 parts by weight of epichlorohydrin rubber (Manufacturer: Daiso Chemical Co., Ltd., product name: Epion301), 20 parts by weight of calcium carbonate, 2 parts by weight of carbon black (Manufacturer: Mitsubishi Chemical Corporation, product name: MA100) as a filler, 5 parts by weight of zinc oxide, and 2 parts by weight of tetrabutylammonium chloride as an ion-conducting agent were put into a hermetic mixer and kneaded for 20 minutes, and then 1.5 parts by weight of dibenzothiazyl disulfide as a vulcanization accelerator, 1.2 parts by weight of dipentamethylene thiuram tetrasulfide, and 1.0 part by weight of sulfur as a crosslinking agent were further added thereto and kneaded in an open roll for about 15 minutes to obtain a rubber composition. This rubber composition was extruded together with the shaft using a crosshead rubber extruder to be formed into a roller shape having an outer diameter of about 13 mm. Next, after a vulcanization process was performed in a vulcanization tube at about 160° C. for about 1.5 hours, both ends of the rubber were cut, the surface of the rubber was polished such that the outer diameter of the center portion of the roller became about 12 mm, and then the surface thereof was washed, dried and then irradiated with ultraviolet light to form a conductive elastic body layer 2. Thus, a conductive elastic body layer 2 having a thickness of about 4 mm and formed along the outer circumference surface of the shaft was obtained.

Formation of Surface Layer 3

Examples 1 to 9 and Comparative Examples 1 to 18

In Examples 1-9 and Comparative Examples 1-9, forming each of the first surface layer 3*a* and the second surface layer 3*b* included obtaining 69.26 parts by weight of a polycaprolactone polyol (Manufacturer: Daicel Chemical Industries, product name: PCL320, hydroxyl value: 84 KOH mg/g), 51.24 parts by weight of isocyanate-type blocked HDI (Manufacturer Aekyung Chemical Co., Ltd., product name: D660, non-volatile matter 60%, NCO 6.5%, blocking agent: methyl ethyl ketone oxime), 1 part by weight of a polymer dispersant (Manufacturer: Lubrizol Co., Ltd., product name: SOLSPERSE™ 20000), 3 parts by weight of carbon black (Manufacturer: Mitsubishi Chemical Corporation, product name: MA100, specific surface area: 110 $m^2/g$, pH 3.5), 2 parts by weight of hydrophobic fumed silica (Manufacturer: Evonik Resource Efficiency GmbH, trade name: AEROSIL R 974, specific surface area: 110 $m^2/g$), and 0.1 parts by weight of silicone oil (Manufacturer: ShineEtsu Chemical Co., Ltd., product name: KF6002) that were mixed with 200 parts by weight of a methyl isobutyl ketone (MIBK) solvent. For each of surface layer 3*a* and surface layer 3*b*, resin particles and inorganic particles whose added amounts are given in Tables 2 and 3 according to Examples 1-9 and Comparative Examples 1-9 were added as roughness forming particles, and were sufficiently stirred until the coating liquid became uniform to prepare a coating liquid for forming the first surface layer 3*a* and the second surface layer 3*b*, respectively. For Comparative Examples 10-18, the above process was also followed except that a single layer of surface layer 3 was formed for purposes of comparison. That is, resin particles and inorganic particles whose added amounts are given in Table 4 were added as roughness forming particles, and were sufficiently stirred until the coating liquid became uniform to prepare a coating liquid for forming a single layer of surface layer 3.

For Examples 1-9 and Comparative Examples 1-9, the coating liquid for forming the first surface layer 3*a* was applied to the surface of the roller having the conductive elastic body layer 2 by a roll coating method and the coating liquid for forming the second surface layer 3*b* was applied to the surface of the roller having the first surface layer 3*a* by a roll coating method. For Comparative Examples 10-18, the coating liquid for forming the surface layer 3 having a single layer was applied to the surface of the roller having the conductive elastic body layer 2 by a roll coating method. In each case, in order to obtain a desired layer thickness, coating was performed while scraping off unnecessary coating liquid with a scraper. The coated roller was air-dried for about 10 minutes and dried at 160° C. for about 1 hour using an oven. Thus, a charging roller in which the surface layer 3 (including either a first surface layer 3*a* and a second surface layer 3*b* for Examples 1-9 and Comparative Examples 1-9 or a single surface layer 3 for Comparative Examples 10-18) having a desired thickness laminated on the conductive elastic body layer 2 was obtained.

The types and properties of the resin particles or inorganic particles used in Examples 1 to 9 and Comparative Examples 1 to 18 are summarized in Table 1. The evaluation results of the charging rollers are summarized in Tables 2, 3, and 4.

TABLE 1

| Product Name | Manufacturer | Particle Type | Average Particle Diameter (μm) | CV Value (%) |
|---|---|---|---|---|
| SSX-103 | Sekisui | Monodispersed | 3 | 10.99 |
| SSX-105 | Plastics | crosslinked | 5 | 10.55 |
| SSX-115 | | PMMA resin | 15 | 10.45 |
| SSX-120 | | | 20 | 10.39 |
| SSX-127 | | | 27 | 11.37 |
| MBX-5 | | Standard | 5 | 22.4 |
| MBX-20 | | dispersed | 20 | 35.43 |
| MBX-30 | | crosslinked | 30 | 36.17 |
| | | PMMA resin | | |
| NP-30 | AGC SI-Tech | Silica | 4 | — |
| NP-200 | | | 20 | — |

TABLE 2

| Coating Layer | | Product Name | Examples 1 | 2 | 3 | 4 | 5 | 6 | 7 | 8 | 9 |
|---|---|---|---|---|---|---|---|---|---|---|---|
| Layer 1 | First Particle | SSX-103 | 10 | 10 | 10 | 5 | 15 | — | 10 | — | 10 |
| | | SSX-105 | — | — | — | — | — | 10 | — | 10 | — |
| | | MBX-5 | — | — | — | — | — | — | — | — | — |
| | | NP-30 | — | — | — | — | — | — | — | — | — |
| Layer 2 | First Particle | SSX-103 | 5 | 5 | 5 | 5 | 5 | 5 | 5 | — | — |
| | | SSX-105 | — | — | — | — | — | — | — | 5 | 5 |
| | | MBX-5 | — | — | — | — | — | — | — | — | — |
| | | NP-30 | — | — | — | — | — | — | — | — | — |
| | Second Particle | SSX-115 | — | — | — | — | — | — | — | — | — |
| | | SSX-120 | 10 | 5 | 15 | 10 | 10 | 10 | — | 10 | — |
| | | SSX-127 | — | — | — | — | 5 | — | 10 | — | 10 |
| | | MBX-20 | — | — | — | — | — | — | — | — | — |
| | | MBX-30 | — | — | — | — | — | — | — | — | — |
| | | NP-200 | — | — | — | — | — | — | — | — | — |
| Initial image | | Micro Jitter | ⊚ | ○ | ⊚ | ⊚ | ⊚ | ⊚ | ⊚ | ⊚ | ⊚ |
| | | Background | ⊚ | ⊚ | ○ | ⊚ | ⊚ | ⊚ | ⊚ | ⊚ | ⊚ |
| | | Image Uniformity | ⊚ | ⊚ | ⊚ | ⊚ | ⊚ | ⊚ | ⊚ | ⊚ | ⊚ |
| Image after printing 50,000 sheets of paper | | Micro Jitter | ⊚ | Δ | ○ | ○ | ○ | ⊚ | ⊚ | ⊚ | ⊚ |
| | | Background | ⊚ | ⊚ | ○ | ○ | ○ | ⊚ | ⊚ | ⊚ | ⊚ |
| | | Image Uniformity | ⊚ | ⊚ | ○ | ⊚ | ○ | ○ | ⊚ | ○ | ○ |
| Surface Roughness | | $R_Z$ | 22.8 | 18.1 | 23.9 | 22.9 | 21.1 | 19.8 | 25.9 | 20.3 | 26.7 |
| | | $RS_M$ | 205 | 298 | 148 | 191 | 220 | 208 | 198 | 228 | 241 |
| | | $R_{SK}$ | 1.35 | 1.26 | 1.22 | 1.13 | 1.36 | 1.12 | 1.56 | 1.08 | 1.68 |
| Coating Layer Thickness (μm) | | | 12.8 | 10.6 | 13.3 | 11.9 | 13.2 | 13.9 | 14.1 | 12.9 | 14.0 |

TABLE 3

| Coating Layer | | Product Name | Comparative Examples 1 | 2 | 3 | 4 | 5 | 6 | 7 | 8 | 9 |
|---|---|---|---|---|---|---|---|---|---|---|---|
| Layer 1 | First Particle | SSX-103 | 20 | — | — | — | 10 | 10 | 10 | 10 | — |
| | | SSX-105 | — | 20 | — | — | — | — | — | — | — |
| | | MBX-5 | — | — | 10 | — | — | — | — | — | 10 |
| | | NP-30 | — | — | — | 10 | — | — | — | — | — |
| Layer 2 | First Particle | SSX-103 | 20 | — | — | — | 10 | 10 | 10 | 10 | — |
| | | SSX-105 | — | 20 | — | — | — | — | — | — | — |
| | | MBX-5 | — | — | 10 | — | — | — | — | — | 10 |
| | | NP-30 | — | — | — | 10 | — | — | — | — | — |
| | Second Particle | SSX-115 | — | — | — | — | 10 | — | — | — | — |
| | | SSX-120 | 10 | 10 | 10 | 10 | — | — | — | — | — |
| | | SSX-127 | — | — | — | — | — | — | — | — | 10 |
| | | MBX-20 | — | — | — | — | — | 10 | — | — | — |
| | | MBX-30 | — | — | — | — | — | — | 10 | — | — |
| | | NP-200 | — | — | — | — | — | — | — | 10 | — |
| Initial image | | Micro Jitter | ○ | ○ | ○ | X | X | ○ | ⊚ | X | ⊚ |
| | | Background | Δ | Δ | ○ | ○ | ⊚ | ⊚ | ⊚ | ⊚ | ○ |
| | | Image Uniformity | Δ | Δ | ○ | ○ | ⊚ | ○ | ○ | ○ | ○ |
| Image after printing 50,000 sheets of paper | | Micro Jitter | Δ | Δ | X | X | X | Δ | Δ | X | Δ |
| | | Background | Δ | Δ | ○ | ○ | ○ | ○ | ○ | ○ | Δ |
| | | Image Uniformity | X | X | ○ | ○ | ○ | Δ | Δ | Δ | Δ |
| Surface Roughness | | $R_Z$ | 19.8 | 22.3 | 19.1 | 20.3 | 15.9 | 21.9 | 24.8 | 19.6 | 23.9 |
| | | $RS_M$ | 116 | 83 | 89 | 136 | 83 | 93 | 79 | 145 | 91 |
| | | $R_{SK}$ | 0.91 | 0.86 | 0.92 | 1.18 | 0.81 | 0.98 | 0.89 | 1.36 | 0.92 |
| Coating Layer Thickness (μm) | | | 15.8 | 16.9 | 13.5 | 12.8 | 13.2 | 15.9 | 17.5 | 14.8 | 15.3 |

TABLE 4

| Coating Layer | | Product Name | Comparative Examples 10 | 11 | 12 | 13 | 14 | 15 | 16 | 17 | 18 |
|---|---|---|---|---|---|---|---|---|---|---|---|
| Layer 1 | First Particle | SSX-103 | 20 | — | — | — | 10 | 10 | 10 | 10 | — |
| | | SSX-105 | — | 20 | — | — | — | — | — | — | — |
| | | MBX-5 | — | — | 10 | — | — | — | — | — | 10 |
| | | NP-30 | — | — | — | 10 | — | — | — | — | — |

TABLE 4-continued

| Coating Layer | Product Name | Comparative Examples 10 | 11 | 12 | 13 | 14 | 15 | 16 | 17 | 18 |
|---|---|---|---|---|---|---|---|---|---|---|
| Second Particle | SSX-115 | — | — | — | — | 10 | — | — | — | — |
| | SSX-120 | 10 | 10 | 10 | 10 | — | — | — | — | — |
| | SSX-127 | — | — | — | — | — | — | — | — | 10 |
| | MBX-20 | — | — | — | — | — | 10 | — | — | — |
| | MBX-30 | — | — | — | — | — | — | 10 | — | — |
| | NP-200 | — | — | — | — | — | — | — | 10 | — |
| Initial image | Micro Jitter | Δ | Δ | Δ | X | X | Δ | ○ | X | ○ |
| | Background | Δ | Δ | ○ | ○ | ◎ | ◎ | ○ | ○ | ○ |
| | Image Uniformity | Δ | Δ | ○ | ○ | ○ | ○ | ○ | ○ | ○ |
| Image after printing 50,000 sheets of paper | Micro Jitter | X | X | X | X | X | X | Δ | X | Δ |
| | Background | Δ | Δ | ○ | ○ | ○ | Δ | Δ | X | Δ |
| | Image Uniformity | X | X | Δ | Δ | ○ | Δ | X | X | X |
| Surface Roughness | $R_Z$ | 19.8 | 18.9 | 20.6 | 21.3 | 14.9 | 22.8 | 24.3 | 18.9 | 23.5 |
| | $RS_M$ | 88 | 83 | 88 | 92 | 78 | 112 | 99 | 89 | 118 |
| | $R_{SK}$ | 0.89 | 0.91 | 0.86 | 0.96 | 0.79 | 0.93 | 0.91 | 0.88 | 0.96 |
| Coating Layer Thickness (μm) | | 7.8 | 8.8 | 7.6 | 8.5 | 7.1 | 8.9 | 9.8 | 8.6 | 9.6 |

Image Evaluation

Image evaluations in the case of using the charging rollers obtained in Examples 1 to 9 and Comparative Examples 1 to 18 are performed as follows. After removing the charging roller from a commercially available laser printer (Manufacturer: HP, Model: HP JADE 30 PPM Color LaserJet A3), each of the charging rollers obtained in Examples 1 to 9 and Comparative Examples 1 to 18 was mounted thereon instead of the above charging roller. The printer was left for 8 hours under L/L (temperature 10° C. and relative humidity 10%) environmental conditions. Regarding the initial image obtained using this printer and the image after printing 50,000 sheets of paper, micro-jitter (M/J), background (B/G), and image uniformity were evaluated as follows. The results thereof are summarized in Tables 2, 3, and 4. In this case, printing conditions were as follows.

Printing speed: typical speed 305 mm/sec;

Print paper type: Office Paper EC;

Applied bias: a DC voltage applied to the charging roller contacting the photoconductor is appropriately adjusted such that the photoconductor surface potential is −6000 V.

Evaluation of Micro-Jitter (M/J)

The electrophotographic image for micro-jitter evaluation was a half-tone image (medium-concentration image having horizontal stripes of width 1 dot and interval 2 dots in a direction perpendicular to the rotation direction of the photoconductor). This image was observed, and the presence or absence and/or degree of fine horizontal stripes (i.e., micro-jitter (M/J)) was evaluated according to the following criteria. However, in the case of initial image evaluation, after printing 30 sheets of paper under L/L conditions (temperature 10° C. and relative humidity 10%), one sheet of image having the worst image quality was evaluated.

◎: Micro-jitter does not appear in the image at all;

○: Micro-jitter appears slightly on a part of the image, but there is no practical problem;

Δ: Micro-jitter appears slightly at the front of the image, but this is within the usable range: and X: Micro-jitter appears at the front of the image, thus causing practical problems.

Evaluation of Background (B/G)

The electrophotographic image for background evaluation is a white image with a medium concentration (density). The image background was evaluated according to the following criteria. In the case of initial image evaluation, after printing 20 sheets of paper under L/L conditions (temperature 10° C. and relative humidity 10%), one sheet of image having the worst image quality was evaluated.

◎: background density is less than 0.01 (optimally usable);

○: background density is 0.01 or greater and less than 0.02 (usable);

Δ: background density is 0.02 or greater and less than 0.03 (in some cases, usable); and X: background density is 0.03 or greater (not usable).

Evaluation of Image Uniformity

The electrophotographic image for image uniformity evaluation, similar to electrophotographic image for micro-jitter evaluation, is a half-tone image (medium-density image having horizontal stripes of width 1 dot and interval 2 dots in a direction perpendicular to the rotation direction of the photoconductor). This image was observed, and image uniformity was evaluated according to the following criteria. In the case of initial image evaluation, after printing 20 sheets of paper under H/H conditions (temperature 30° C. and relative humidity 80%), one sheet of image having the worst image quality was evaluated.

◎: image density unevenness (so called, image stains) does not exist;

○: image density unevenness does not exist, but image has slight granularity;

Δ: image density unevenness slightly exists to such a degree of no practical problem; and X: image density unevenness exists to impair image quality.

Referring to Tables 2, 3, and 4, it may be found that an example electrophotographic imaging apparatus provided with the charging rollers of Examples 1 to 9 in which the kinds of first and second particles, the average particle diameter of first and second particles, and the content of first and second particles are adjusted may stably generate high-quality images having few or no image defects such as background (B/G), micro-jitter (M/J), and image density unevenness. A reason for this may be that the charging rollers of Examples 1 to 9 may maintain stable charging characteristics even when they are used under all usable environments from low-temperature low-humidity environment atmosphere to high-temperature high-humidity environment atmosphere.

Although examples of the disclosure have been illustrated and described hereinabove, the disclosure is not limited thereto, and may be variously modified and altered by those skilled in the art to which the disclosure pertains without departing from the spirit and scope of the disclosure claimed in the claims. These modifications and alterations are to fall within the scope of the disclosure.

What is claimed is:

1. A charging member comprising:

a conductive support:

a conductive elastic body layer on the conductive support;

a first surface layer on the conductive elastic body layer; and a second surface layer on the first surface layer, wherein the first surface layer includes a binder resin and a first plurality of first particles dispersed in the binder resin of the first surface layer, wherein the second surface layer includes the binder resin, a second plurality of first particles, and second particles, the second plurality of first particles and the second particles being dispersed in the binder resin of the second surface layer, and wherein an average diameter $d_1$ of the first particles is 3 $\mu m \le d_1 \le 6$ μm and an average diameter $d_2$ of the second particles is 20 $\mu m \le d_2 \le 26$ μm.

2. The charging member of claim 1, wherein a surface roughness profile of the charging member is 18 $\mu m \le R_Z \le 28$ μm, 100 $\mu m \le RS_M \le 400$ μm, and $1.0 \le R_{SK} \le 2.0$, where $R_Z$ is a maximum profile height, $RS_M$ is a mean width of profile elements, and $R_{SK}$ is a profile skewness.

3. The charging member of claim 1, wherein an amount of the first plurality of first particles in the binder resin of the first surface layer is in a range of about 5 parts by weight to about 20 parts by weight based on 100 parts by weight of the binder resin of the first surface layer, wherein an amount of the second plurality of first particles in the binder resin of the second surface layer is in a range of about 5 parts by weight to about 20 parts by weight based on 100 parts by weight of the binder resin of the second surface layer, and wherein an amount of the second particles in the binder resin of the second surface layer is in a range of about 5 parts by weight to about 15 parts by weight based on 100 parts by weight of the binder resin of the second surface layer.

4. The charging member of claim 1, wherein the binder resin comprises epichlorohydrin (ECO) rubber or urethane resin.

5. The charging member of claim 1, wherein each of the first particle and the second particle comprises an acrylic resin particle.

6. The charging member of claim 5, wherein the acrylic resin particle comprises a polymethyl methacrylate (PMMA) particle or a polymethyl acrylate (PMAA) particle.

7. The charging member of claim 1, wherein an average total thickness $T_A$ of the first surface layer and the second surface layer is 9 $\mu m \le T_A \le 15$ μm.

8. A cartridge for an electrophotographic imaging apparatus, the cartridge comprising:

an electrophotographic photoconductor;

a charging member to charge the electrophotographic photoconductor;

a developing unit to develop an electrostatic latent image to a visible image; and a cleaning unit to clean a surface of the electrophotographic photoconductor, wherein the charging member comprises:

a conductive support;

a conductive elastic body layer on the conductive support;

a first surface layer on the conductive elastic body layer; and a second surface layer on the first surface layer, wherein the first surface layer includes a binder resin and a first plurality of first particles dispersed in the binder resin of the first surface layer, wherein the second surface layer includes the binder resin, a second plurality of first particles, and second particles, the second plurality of first particles and the second particles being dispersed in the binder resin of the second surface layer, and wherein an average diameter $d_1$ of the first particles is 3 $\mu m \le d_1 \le 6$ μm and an average diameter $d_2$ of the second particles is 20 $\mu m \le d_2 \le 26$ μm.

9. The cartridge of claim 8, wherein a surface roughness profile of the charging member is 18 $\mu m \le R_Z \le 28$ μm, 100 $\mu m \le RS_M \le 400$ μm, and $1.0 \le R_{SK} \le 2.0$, where $R_Z$ is a maximum profile height, $RS_M$ is a mean width of profile elements, and $R_{SK}$ is a profile skewness.

10. The cartridge of claim 8, wherein an amount of the first plurality of first particles in the binder resin of the first surface layer is in a range of about 5 parts by weight to about 20 parts by weight based on 100 parts by weight of the binder resin of the first surface layer, wherein an amount of the second plurality of first particles in the binder resin of the second surface layer is in a range of about 5 parts by weight to about 20 parts by weight based on 100 parts by weight of the binder resin of the second surface layer, and wherein an amount of the second particles in the binder resin of the second surface layer is in a range of about 5 parts by weight to about 15 parts by weight based on 100 parts by weight of the binder resin of the second surface layer.

11. The cartridge of claim 8, wherein the binder resin comprises epichlorohydrin (ECO) rubber or urethane resin.

12. The cartridge of claim 8, wherein the first particle and the second particle comprises an acrylic resin particle.

13. The cartridge of claim 12, wherein the acrylic resin particle comprises a polymethyl methacrylate (PMMA) particle or a polymethyl acrylate (PMAA) particle.

14. The cartridge of claim 8, wherein an average total thickness $T_A$ of the first surface layer and the second surface layer is 9 $\mu m \le T_A \le 15$ μm.

15. An electrophotographic imaging apparatus comprising:

an electrophotographic photoconductor;

a charging member to charge the electrophotographic photoconductor;

an exposure unit to form an electrostatic latent image on a surface of the electrophotographic photoconductor;

a developing unit to develop the electrostatic latent image to a visible image;

a transfer unit to transfer the visible image onto an image receiving member; and a cleaning unit to clean a surface of the electrophotographic photoconductor, wherein the charging member comprises:

a conductive support;

a conductive elastic body layer on the conductive support;

a first surface layer on the conductive elastic body layer; and a second surface layer on the first surface layer, wherein the first surface layer includes a binder resin and a first plurality of first particles dispersed in the binder resin of the first surface layer, wherein the second surface layer includes the binder resin, a second plurality of first particles, and second particles, the second plurality of first particles and the second particles being dispersed in the binder resin of the second surface layer, and wherein an average diameter $d_1$ of the first particles is 3 $\mu m \leq d_1 \leq 6$ $\mu m$ and an average diameter $d_2$ of the second particles is 20 $\mu m \leq d_2 \leq 26$ $\mu m$.

* * * * *